United States Patent [19]
Craft

[11] 3,717,193
[45] Feb. 20, 1973

[54] TIRE MOUNTING TOOL
[75] Inventor: Roger L. Craft, St. Joseph, Mo.
[73] Assignee: FMC Corporation
[22] Filed: Feb. 5, 1971
[21] Appl. No.: 112,852

[52] U.S. Cl. ................................. 157/1.3, 157/1.24
[51] Int. Cl. ............................................ B60c 25/04
[58] Field of Search ..................... 157/1.22, 1.24, 1.3

[56] References Cited
UNITED STATES PATENTS

| | | | |
|---|---|---|---|
| 3,247,883 | 4/1966 | Strong et al. | 157/1.22 |
| 3,517,723 | 6/1970 | Hogg et al. | 157/1.24 |
| 3,100,011 | 8/1963 | Lydle | 157/1.22 |

Primary Examiner—Granville Y. Custer, Jr.
Attorney—Schmidt, Johnson, Hovey & Williams

[57] ABSTRACT

A tool for mounting a tire upon a wheel having a drop center, the tool having a handle and head means on the handle, the head means including a leading element and a trailing member, the element and the member being angularly disposed on opposite sides of the center line of the handle of the tool, the tool being engageable with the wheel whereby the leading element is placed into engagement with the tire for moving successive edge portions thereof to a position outwardly of the wheel, the trailing member having means thereon for also engaging the tire whereby to push the tire into the drop center of the wheel.

4 Claims, 4 Drawing Figures

PATENTED FEB 20 1973 3,717,193
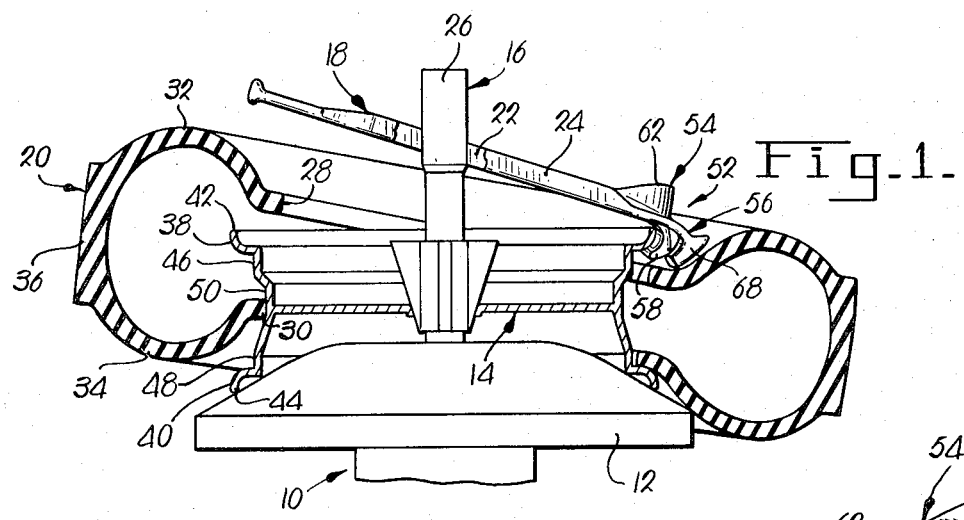
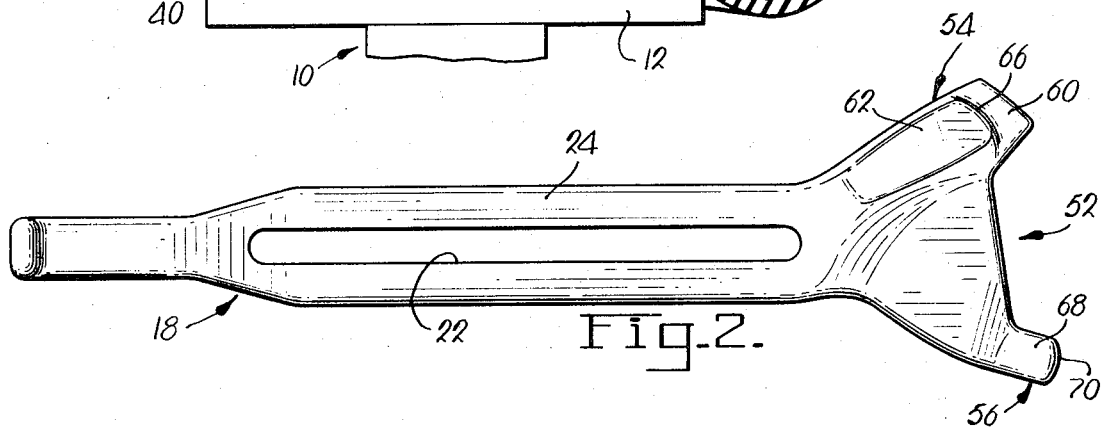
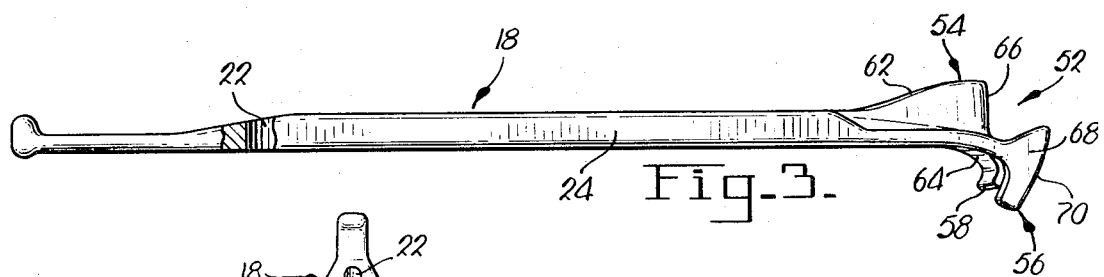
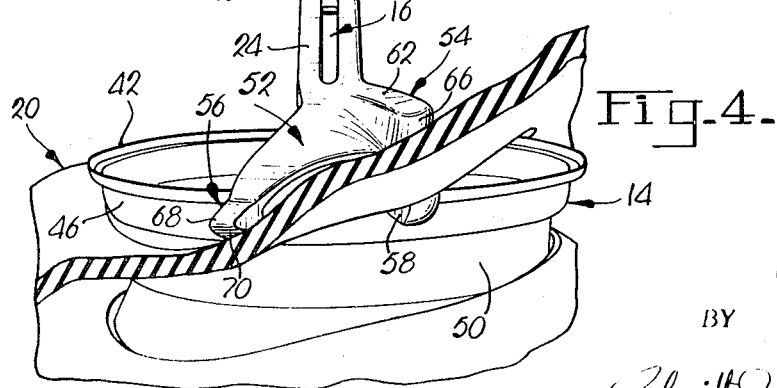
INVENTOR.
Roger L. Craft
BY
Schmidt, Johnson, Hovey & Williams
ATTORNEYS.

TIRE MOUNTING TOOL

This invention relates generally to the field of tire changing equipment and, more particularly, to an improved tire mounting tool for use with a drop center type wheel and a conventional tire changing stand.

It has long been a problem for those who perform tire-changing services that the operator of a conventional tire-mounting tool used in conjunction with a tire-changing stand, must manually force the tire bead down into the drop center zone of the wheel after it has once been slipped over the peripheral edge of the wheel rim flange. This displacement into the drop center zone is necessary if the remainder of the bead is to be installed over the peripheral edge of the rim flange. Manual positioning of the tire bead into the drop center zone can be hazardous to the operator of the tire changing equipment and such positioning of the bead may also damage the tire casing and the bead, which damage may result in the failure of the tire at a later date. Tire servicing personnel have sustained injuries both of lesser and greater degree while attempting to force a tire bead into its proper position within the drop center of a wheel. In many instances the tire bead will bind on the rim flange of the wheel during attempted installation of a portion of the tire in the drop center zone with resultant damage to the tire casing and bead surfaces.

Accordingly, it is the primary object of this invention to provide a tire-mounting tool for use in positioning tires on drop center wheels, which tool will insure positive placement of the tire bead into the drop center zone after the bead has been displaced over the peripheral edge of the wheel rim flange.

Another important object of this invention is to provide such a tool which substantially eliminates the need for manual positioning of the tire beads and casing during installation of the tire on the wheel.

It is still another significant object of this invention to provide a tire-mounting tool which substantially reduces the tendency of the tire bead to bind on the wheel rim flange during installation of the tire bead as a consequence of improper positioning into the drop center zone.

A yet further object of this invention is to provide a tool which is safe in its use and positive in its accomplishments, the tool including a handle, which handle has a head thereon, the head including a leading element which is brought into engagement with the tire whereby to push the bead of the tire out over the rim flange of the wheel upon which the tire is to be mounted, the head also including a trailing member which is likewise in engagement with the tire at a point spaced normally rearwardly of the point of engagement of the tire by the leading element, such points being maintained in constant spaced relationship and being angularly disposed on opposite sides of the center line of the tool, the trailing member serving to position the bead of the tire within the drop center area of the wheel upon which the tire is being mounted.

Other objects will include details of construction which will become apparent from the following specification and accompanying drawing, wherein:

FIG. 1 is a side elevational view of the tool of this invention being used with a conventional changing stand and showing a tire and wheel with one bead mounted thereon in cross section;

FIG. 2 is a plan view of the tool;

FIG. 3 is a side elevational view of the tool; and

FIG. 4 is a perspective view of the operative relationship of the tool, the tire and the wheel during use of the tool to mount the tire on the wheel, with a part of a tire broken away and in cross section.

In the embodiment of the invention chosen for illustration there has been illustrated portions of a power driven tire changing stand of conventional construction, although it should be understood that the tool hereinafter described may also be used in conjunction with other types of tire-changing stands, both of the power driven and non-power driven varieties.

In the drawing, the tire-changing stand chosen for purposes of illustration is broadly designated by the numeral 10 and includes a base member 12 upon which a wheel 14 is positioned in the manner shown in FIG. 1 for instance, there being a rotatable, vertically positioned, upwardly extending center post 16 forming a part of the stand 10 and usable in conjunction with the tire-mounting tool 18 in the manner hereinafter described. The tool 18 is used to mount a tire 20 on the wheel 14 in the manner herein chosen for illustration and hereinafter described by placing the tool 18 over the center post 16 and more particularly, by positioning a slot 22 formed in the handle 24 of the tool 18 in surrounding relationship to a flattened extremity 26 of the rotatable center post 16.

Conventional vehicle tires of the type to be mounted through use of the tool as disclosed herein, are of a flexible material such as rubber or the like and normally present a pair of spaced, annular, radially innermost opposed beads 28 and 30, the beads being a part of and corresponding to respective side portions 32 and 34 of the tire 20, which side portions are each joined at the outermost edges thereof with the tread portion 36 of the conventional tire 20.

The wheel 14 upon which the tire 20 is to be mounted is of the "drop center" type and presents throughout its outermost circumferential periphery a pair of spaced, bead-receiving surfaces 38 and 40 which are adjacent opposed peripheral edges 42 and 44 of wheel 14 respectively. Positioned inwardly on the outer circumferential surface of the wheel 14 from the bead receiving areas 38 and 40 are a pair of corresponding, generally flattened rim flange areas 46 and 48, the inner edges of said rim flange areas 46 and 48 serving to define the drop center zone or area 50 of the wheel 14. It will be noted that the drop center area is of smaller diameter than are the rim flange areas 46 and 48, which rim flange areas are, in turn, of smaller diameter than bead-receiving areas 38 and 40, the peripheral edges 42 and 44 of the wheel being of greater diameter than the bead-receiving surfaces 38 and 40. Wheels of the configuration hereinabove described are conventional in nature and are provided in various overall diameters, it being the purpose of the tool herein disclosed to mount tires on wheels such as described above, regardless of the diameter of the wheel and to insure positive placement of the tire with respect to the wheel.

To this end, the tool 18 is provided with a head 52 at one extremity of the handle 24, the head 52 broadly including a leading element 54 and a trailing member 56, the element and the member being angularly disposed on opposite sides of the center line of the tool as is apparent from FIG. 2 of the drawing.

The leading element 54 of tool 18 is provided with a curved portion in the nature of a hook 58 which faces inwardly with respect to the wheel 14 and is particularly intended to engage the uppermost peripheral edge 42 thereof in the manner shown for instance, in FIG. 1 of the drawing. Hook 58 is also provided with a tire engaging surface 60 which, when the tool is in use, faces radially outwardly of the wheel 14, surface 60 also including a portion 62 in the nature of an upwardly projecting prong. A portion of the leading element 54 is of wedge-like configuration, the leading part thereof being thinner than the following part along the dimensions of the leading element 54 extending generally radially outwardly relative to the wheel 14. Thus, as seen in FIGS. 1 and 2, the leading element 54 is provided with a hook-like member 58 which is received over the peripheral edge 42 of the wheel 14, the inner face 64 of the hook being in engagement with the peripheral edge 42 and a portion of the adjacent bead-receiving surface 38, the outer face 60 of the hook 58 being of curved configuration and being in engagement with the tire as the tool is utilized, a portion of the outer face 66 of the upwardly extending prong 62 also engaging the tire as it is mounted on the wheel, and as greater pressure is exerted on the tire by the tool as mounting is finalized. However, the primary point of engagement of leading element 54 with the tire 20 is throughout the surface 60.

The trailing member 56 is positioned in constant spaced relationship from the leading element 54 and, as illustrated in FIG. 2, is angularly inclined outwardly with respect to the center line of the handle 24 of the tool 18, the trailing member 56 being designed and positioned to push the bead 28 of the tire being mounted into the drop center area of the wheel 14.

To this end, trailing member 56 is provided with a foot 68 having an outwardly facing tire-engaging surface 70 facing transversely inwardly of the wheel 14, the bead-engaging surface 70 of trailing member 56 being disposed a greater distance from the wheel 14 and at a position closer to the drop center area 50 thereof than is the bead-engaging surface 60 of the leading element 54.

While, in the embodiment chosen for illustration, the wheel engaging means is in the form of hook 58 on leading element 54, and particularly face 64 thereof, it should be understood that the means for engaging the peripheral edge 42 of wheel 14 could be located on the trailing member 56 rather than on leading element 54. For that matter, suitable parts of either leading element 54 or trailing member 56, or both of them, could be utilized to engage edge 42 to thereby position the tool radially with respect to wheel 14.

It is to be particularly noted that tire bead-engagement surface 60 of leading element 54 and tire-engaging surface 70 of member 56, are located in constant spaced relationship from one another and in a position whereby, during installation of the tire onto the wheel, said points of engagement lay on lines radiating from a common point which is substantially centered longitudinally on the center line of the tool 18, said lines forming equal angles with respect to the center line of the tool. By this disposition of the leading element 54 and trailing member 56, the tool 18 can be used with wheels of varying diameters, as by shifting the handle 24 relative to flattened portion 26 by means of slot 22 so that the inner face 64 is brought into engagement with the peripheral edge 42 of the wheel 14 while maintaining a constant spaced relationship between the bead-engaging surfaces of the leading element 54 and trailing member 56. In utilizing the tool hereinabove described, the wheel 14 upon which the tire 20 is to be mounted, is initially placed upon the stand 10 as illustrated in FIG. 1 of the drawing. The tire 20 is then loosely positioned over the wheel 14 with the bead 28 of the tire being loosely slipped over the peripheral edge 42 of the wheel 14 to the extent that is manually possible. The tool 18 is then placed over flattened portion 26 whereby the post 16 extends through slot 22. The head 52 of the tool 18 is then moved along the free edge and radially inwardly with respect to the wheel 14 to a point where face 64 is brought into engagement with the uppermost peripheral edge 42 and bead-engaging surface 38 of the wheel 14, the tool then being rotated further along the free edge of the wheel 14 to bring bead-engaging surface 60 into engagement with the bead 28 of the tire 20, it being noted that under certain conditions of force and placement of the tire on the wheel that surface 66 of leading element 54 may also be concurrently brought into engagement with a portion of the tire 20. Such engagement by the leading element 54 causes the bead 28 and its adjacent side portion 32 to be forced inwardly with respect to the peripheral edge 42 of the wheel 14. As greater forces are brought to bear against the tire, the surface 66 will continue in engagement with the tire and will prevent the bead 28 from slipping up and over the head 52, the reactionary force of the bead 28 maintaining the face 64 of the leading element 54 in engagement with the peripheral edge 42 of the wheel 14 regardless of the size of the wheel. Thus, the forces and relationships mentioned serve to maintain the bead 28 positioned and guided relative to the wheel 14 during further annular movement of the head 54 with respect to the tire 20 and to maintain the uppermost bead 28 in a proper, outwardly spaced relationship from the peripheral edge 42 of the wheel 14.

Continuing annular rotative movement of the tool 18 by the post 16 causes successive edge portions of the uppermost bead 28 to be pushed by the bead-engaging surfaces 60 and 66 to a position disposed radially outwardly of the peripheral edge 42 and into a position for downward and inward displacement across the peripheral edge 42 and into the drop center zone 50 by the trailing member 56.

Thus, tire-engaging surface 70 of the trailing member 56 is brought into contact with the bead 28 and adjacent side portion 32 of the tire 20 and, by virtue of the configuration and relative disposition of the foot 68, the bead 28 is forced downwardly into the drop center area 50 of the wheel 14. Thus the foot 68 serves to move those portions of the bead 28 which have already been displaced radially outwardly of the wheel 14 transversely inwardly across the peripheral edge 42 of the wheel 14, the bead-receiving surface 38 and the rim flange area 46 into the drop center area 50 of the wheel. It is important that the foot 68 and its tire-engaging surface 70 be of such configuration and disposition that the bead 28 will be pushed downwardly and inwardly across the above mentioned areas 42, 38 and 46 of the wheel as illustrated in FIG. 1 and cause the bead to move positively into the drop center area 50.

Once the rotation of the tool 18 has been completed throughout the entire periphery of the wheel 14, the uppermost bead of the tire will be positioned within the drop center area 50 whereby the tire may then be inflated and the beads 28 and 30 seated upon their corresponding bead-receiving areas 38 and 40 respectively, it being noted of course, that the tool 18 will have been removed from post 16 and any engagement with wheel 14 or tire 20 prior to such inflation of the tire.

It will be further appreciated that the tool hereinabove described is not limited to use in connection with a power operated tire-changing stand but rather may be used manually in placing a tire upon a wheel, the tool serving the same advantages as hereinabove described in readily and easily pushing the edge of the tire adjacent the wheel initially outwardly and thence downwardly and inwardly to a point within the drop center area of the wheel.

Having thus described the invention, what is claimed as new and desired to be secured by Letters Patent is:

1. A tool for use in mounting a tire on a wheel having a pair of spaced, peripheral edges, a bead-receiving area corresponding to each peripheral edge and spaced inwardly therefrom, a rim flange area corresponding to each bead-receiving area and spaced inwardly therefrom and a drop center zone between said rim flange areas and of lesser diameter than said areas, said tool comprising:
   a handle;
   a head on the handle disposed for movement in an annular path about one of the peripheral edges of the wheel when the tool is in use;
   a leading element on the head having a portion for engaging said one of the peripheral edges of the wheel and a surface for engaging a side of the tire when the tire is positioned for mounting upon the wheel and as the head is moved in one direction along said path, said leading element pushing said side of the tire to a position disposed radially outwardly of said peripheral edge of the wheel; and
   a trailing member on said head disposed angularly rearwardly of said leading element and in constant spaced relation therefrom, said member including a foot which defines a tire-engaging surface disposed in closer proximity to said drop center zone than said leading element for engaging said side of the tire as the head is moved through said path whereby to push said side transversely inwardly into the drop center zone of the wheel, said foot being disposed in spaced, radially outward relationship from said wheel.

2. A tool as set forth in claim 1, said foot being inclined inwardly toward the drop center zone of the wheel.

3. A tool as set forth in claim 2, said tire-engaging surface defined by said foot being arcuate.

4. A tool for use in mounting a tire on a wheel having a pair of spaced, peripheral edges, a bead-receiving area corresponding to each peripheral edge and spaced inwardly therefrom, a rim flange area corresponding to each bead-receiving area and spaced inwardly therefrom and a drop center zone between said rim flange areas and of lesser diameter than said areas, said tool comprising:
   a handle;
   a head on the handle disposed for movement in an annular path about one of the peripheral edges of the wheel when the tool is in use;
   a leading element on the head having a portion for engaging said one of the peripheral edges of the wheel and a surface for engaging a side of the tire when the tire is positioned for mounting upon the wheel and as the head is moved in one direction along said path, said leading element pushing said side of the tire to a position disposed radially outwardly of said peripheral edge of the wheel; and
   a trailing member on said head disposed angularly rearwardly of said leading element and in constant spaced relation therefrom, said member including a foot which defines a tire-engaging surface disposed in closer proximity to said drop center zone than said leading element for engaging said side of the tire as the head is moved through said path whereby to push said side transversely inwardly into the drop center zone of the wheel, said tire-engaging surface defined by said foot being disposed at a greater distance radially from the wheel than said tire-engaging surface of said leading element.

* * * * *